May 5, 1970     J. E. HARDER     3,510,726
GRADING AND CASCADING CIRCUIT FOR LIGHTNING ARRESTERS
HAVING A PLURALITY OF SPARK GAPS
Filed Oct. 31, 1967

WITNESSES:

INVENTOR
John E. Harder
BY
ATTORNEY

United States Patent Office 3,510,726
Patented May 5, 1970

3,510,726
GRADING AND CASCADING CIRCUIT FOR LIGHTNING ARRESTERS HAVING A PLURALITY OF SPARK GAPS
John E. Harder, Bloomington, Ind., assignor to Westinghouse Electric Corporation, Pittsburgh, Pa., a corporation of Pennsylvania
Filed Oct. 31, 1967, Ser. No. 679,315
Int. Cl. H05b 37/00, 39/00
U.S. Cl. 315—189                             10 Claims

ABSTRACT OF THE DISCLOSURE

The invention comprises a circuit for voltage grading and cascading a plurality of spark gaps in a lightning arrester with minimum use of precisely made control gaps. The circuit comprises two groups of serially connected capacitors with each capacitor in each group being alternately connected across at least two adjacent, serially connected spark gaps. At least one resistor may be connected in series with at least one of the capacitor groups to enhance further voltage cascading.

BACKGROUND OF THE INVENTION

Figure 1:
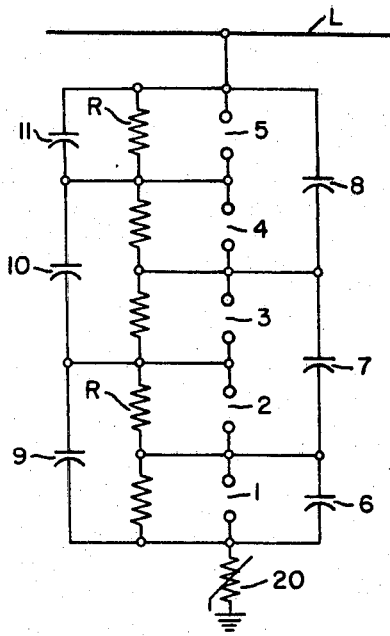

The present invention relates generally to lightning arresters, and particularly to a voltage grading circuit arrangement for a plurality of arrester spark gaps.

High voltage lightning arresters having a plurality of spark gaps usually include voltage grading means which serve to distribute voltage stresses across the arrester in a controlled manner.

The voltage grading means usually includes a resistor and/or capacitor suitably connected across each of the series of spark gaps. When a voltage applied to this type of grading arrangement rises towards sparkover level for the overall arrester, the voltage on each gap therein rises towards its sparkover level. When the first gap reaches this level and sparks over, the voltage previously existing across this gap is redistributed across all of the remaining unfired gaps. Thus, any one of the unfired gaps is little affected by the additional voltage made available by the sparkover of the one or more gaps since the additional voltage is substantially evenly divided by the grading resistors and capacitors. This requires that each spark gap in the arrester be precisely made and controlled to have a critical sparkover level in order to provide a reasonably rapid discharge of an overvoltage through the arrester.

BRIEF SUMMARY OF THE INVENTION

The present invention discloses a voltage grading circuit arrangement which provides the desired distribution of voltage stresses in a lightning arrester while simultaneously providing accurate control of its sparkover characteristics with only one or a limited number of accurately controlled or critical spark gaps. This is accomplished by alternately connecting grading capacitors across each two adjacent, serially connected gaps so that each gap is commonly graded with its adjacent or neighbor gap on one side thereof by one capacitor, and on the other side thereof by another capacitor. One or more resistors may be connected in series with each of the two, serially connected capacitor groups which, with the capacitors, function to enhance voltage cascading through the spark gaps of the arrester.

Voltage cascading occurs when a controlling gap or gaps spark over. The voltage previously across this gap is transferred to an adjacent gap or gaps by the capacitor network, thus placing a substantial overvoltage on this gap. When a resistor is used to enhance cascading, and when one of the capacitors in a series chain is short circuited by the gaps in parallel with it, all of its voltage (the capacitor's) immediately appears across the resistor or resistors in series with it. The resulting voltage drop across the resistor then appears across the gaps connected in parallel therewith, thereby substantially increasing the voltage across these gaps to cause their sparkover. Sparkover of these gaps transfers their potential to adjacent gaps to instantly raise their voltage, and so on until all the gaps are fired.

Since the invention requires only one or a limited number of accurately calibrated gaps to insure rapid sparkover of all the gaps, the cost of the arrester can be substantially reduced and the performance improved.

THE DRAWING

Figure 2:
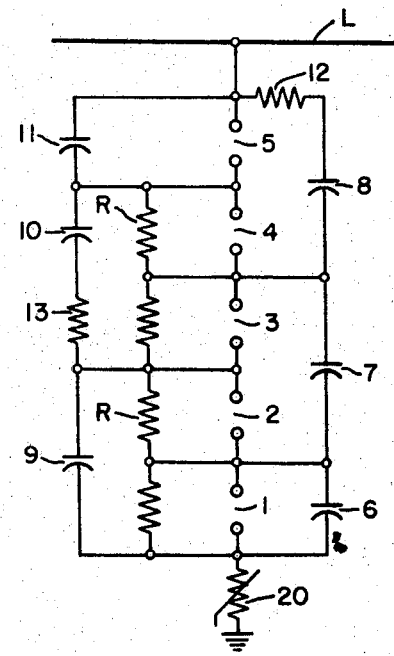

The objects and advantages of the invention will become more apparent from reading the following detailed description in connection with the accompanying drawing, in which FIGS. 1 and 2 are schematic diagrams of arrester voltage grading circuits operable in accordance with the principles of the invention.

PREFERRED EMBODIMENTS

Specifically, there is shown in FIG. 1, a schematic representation of a plurality of serially connected spark gaps forming part of a lightning arrester unit connected between a current carrying line L and ground. Five gaps are shown for purposes of illustration, the gaps being numbered 1 through 5. The arrester includes nonlinear resistance elements, diagrammatically indicated at 20, connected in series with the gaps.

In accordance with the invention, adjacently connected series gaps are alternately provided with a parallel connected voltage grading capacitor. The parallel capacitors are shown disposed on the right and the left of the series gaps, the capacitors on the right of the gaps being numbered 6, 7 and 8, and the capacitors on the left being numbered 9, 10 and 11. The alternately disposed and connected capacitors form two groups or strings of serially connected capacitors. The gaps are further graded with voltage grading resistors R connected thereacross.

In operation, the capacitors 6 through 11 are charged by normal line voltage. The total voltage developed across the gaps 1 through 5 is divided among the gaps and the capacitors in a controlled manner. In the embodiment of FIG. 1, approximately ⅖ of the line voltage appears across each of the capacitors 7, 8, 9 and 10 which is the voltage appearing across their respective pairs of gaps, namely, gaps 2 and 3, 4 and 5, 1 and 2, and 3 and 4. The capacitors 6 and 11, being singularly connected across the gaps 1 and 5 respectively, each have ⅕ of the line voltage developed across them.

When the gaps 1 to 5 are subjected to an overvoltage, such as would occur on the line L when a lightning surge occurs, the sparkover of gap 2, for example, would instantly result in the transfer of its voltage to its adjacent or neighbor gap 3. The gap 3 will then have ⅔ of the total overvoltage across it thereby instantly causing it to spark over.

The capacitor 7 discharges with the sparkover of the gaps 2 and 3, thereby instantly transferring its voltage to the remaining unfired gaps 1, 4 and 5. This instantly raises the potential on these gaps, and when the gap 4 sparks over, the capacitor 10 discharges thereby transferring its charge to the remaining unfired gaps.

Thus, the sparkover of each gap, and each discharge of each capacitor effects instantly the sparkover of adjacently connected gaps. For this reason, only one or two accurately made and calibrated (control) gaps are generally necessary in an arrester unit using the invention. For example, if the gap 2 in FIG. 1 is a control gap, its sparkover instantly starts the above described cascading effect by essentially doubling the voltage across its adjacent gap 3 and by discharging the capacitor 7, which in turn instantly transfers its voltage to the remaining unfired gaps.

The above mentioned nonlinear resistance elements 20 may be connected in series with each of the gaps 1 to 5. Such elements have very low electrical resistance, compared to the impedances of the grading resistors R, when an overvoltage occurs across the arrester unit. Thus, the nonlinear elements have a very low voltage developed across them until all of the gaps have sparked over and power follow current starts to flow.

In FIG. 2, a second embodiment of the invention is schematically shown in which each of the capacitor strings is provided with a serially connected resistor, namely resistors 12 and 13, for enhancing the overall voltage cascading effect. The remainder of the circuit is the same as that shown in FIG. 1.

In operation, the capacitors 6 to 11 are charged by normal line current as described above. The total voltage developed across the five gaps 1 to 5 is divided among the capacitors in a controlled manner so that each capacitor may have approximately ⅖ of the total voltage across itself with the exceptions of the end capacitors 6 and 11. The capacitor 7, for example, is charged to a voltage level corresponding to the voltage developed across the gaps 2 and 3 while the capacitor 10 is charged to a voltage level corresponding to the voltage developed across the gaps 3 and 4.

When the gaps 1 to 5 are subjected to an overvoltage, such as would occur on the line L when a lightning surge occurs, the sparkover of gap 1, for example, would instantly discharge the capacitor 6 so that the voltage developed thereacross is instantly transferred to the other capacitors in its series group. Current flow is thereby developed in the series group, the entire current flow being conducted through the serially connected resistance 12. A voltage drop is thus developed across 12 which immediately appears across the gaps 4 and 5 connected in parallel therewith. This instant increase in the potential across these gaps causes them to rapidly spark over. The capacitor 8, connected in parallel therewith and in series with the resistor 12 discharges, thereby transferring its potential to the remaining capacitors in the group not yet discharged by a set of fired gaps.

When the gaps 1 and 2 have fired, the capacitor 9 discharges, thereby instantly transferring its voltage to the remaining charged capacitors in its series group. Current is caused to flow in the series capacitor group with the total current flow flowing through the serially connected resistance 13 as explained above in connection with the resistor 12. The resulting voltage drop across 13 appears across parallel gap 3, its neighbor gap 4 having been fired by the potential created by the current flow through the resistor 12. With the sparkover of the gap 3, the discharge path to ground from the line L is completed. If the embodiment included additional unfired spark gaps and associated grading capacitors, the sparkover of the gap 3 and the discharge of the capacitor 10 would instantly raise potential of the unfired gaps to cause them to spark over in the manner described above.

Thus, as explained above, each sparkover of each gap, and each discharge of each capacitor effects instantly the firing of adjacently connected gaps. For this reason, only one or two accurately calibrated (control) gaps are necessary in an arrester unit using the invention. For example, if gap 1 in FIG. 2 is a control gap, its sparkover instantly starts the above described voltage cascading effect by essentially doubling the voltage across its adjacent gap 2 and by discharging the capacitor 6 which in turn instantly transfers its voltage to the other capacitors and the resistor 12 in the series capacitor group.

From the foregoing description it should now be apparent that a new, useful and unobvious spark gap grading and voltage cascading means has been disclosed. As explained, the grading and cascading effect is accomplished by capacitances alternately connected across pairs of adjacent or neighbor gaps. Resistance means may be connected in series with the capacitances for enhancing the cascading effect.

Although the invention has been described with a certain degree of particularity, it is to be understood that the disclosure has been made by way of example only and that changes may be made therein without departing from the scope and spirit of the invention.

What is claimed is:

1. A lightning arrester including a plurality of series-connected spark gaps and voltage grading means for said spark gaps, the voltage grading means comprising a plurality of capacitors alternately connected across adjacent pairs of spark gaps, one of said spark gaps being an accurately calibrated control gap adapted to spark over at a predetermined overvoltage to effect rapid sparkover of the remaining gaps.

2. A lightning arrester as defined in claim 1 in which at least a majority of said remaining gaps are not accurately calibrated as to sparkover voltage.

3. A lightning arrester as defined in claim 1 having a small number of accurately calibrated control gaps, as compared to the total number of gaps, the remaining gaps not being accurately calibrated as to sparkover voltage.

4. A lightning arrester as defined in claim 3 having resistance means connected in series with at least some of said capacitors.

5. A lightning arrester including a plurality of series-connected spark gaps and voltage grading means for said spark gaps, the voltage grading means comprising two groups of series-connected capacitors, means for connecting the capacitors of one of said groups individually across successive pairs of spark gaps, and mean for connecting the capacitors of the other group individually across successive pairs of spark gaps but alternating with the first group of capacitors, one of said spark gaps being an accurately calibrated control gap adapted to spark over at a predetermined critical overvoltage to effect rapid sparkover of the remaining gaps.

6. A lightning arrester as defined in claim 5 in which at least a majority of said remaining gaps are not accurately calibrated as to sparkover voltage.

7. A lightning arrester as defined in claim 5 having a small number of accurately calibrated control gaps, as compared to the total number of gaps, the remaining gaps not being accurately calibrated as to sparkover voltage.

8. A lightning arrester as defined in claim 5 having a resistor connected in series with at least one of said groups of capacitors.

9. A lightning arrester as defined in claim 7 having a resistor connected in series with each of said groups of capacitors.

10. A lightning arrester as defined in claim 9 in which each spark gap includes a grading resistor connected across it.

References Cited

UNITED STATES PATENTS

| | | | |
|---|---|---|---|
| 2,618,765 | 11/1952 | Vogelsanger | 315—36 X |
| 2,948,831 | 8/1960 | Stoelting | 315—36 |
| 3,353,059 | 11/1967 | Buffa et al. | 315—36 |
| 3,356,894 | 12/1967 | Lafferty | 315—36 X |
| 3,376,458 | 4/1968 | Liao | 315—36 X |
| 3,414,759 | 12/1968 | Connell et al. | 315—36 |
| 3,418,530 | 12/1968 | Cheever | 315—36 X |

FOREIGN PATENTS

| | | |
|---|---|---|
| 578,664 | 7/1946 | Great Britain. |
| 940,978 | 11/1963 | Great Britain. |
| 1,038,050 | 8/1966 | Great Britain. |
| 1,310,009 | 10/1962 | France. |

JOHN W. HUCKERT, Primary Examiner

A. J. JAMES, Assistant Examiner

U.S. Cl. X.R.

315—35, 36; 317—62